July 23, 1940.                K. E. STUART                2,208,778
          MEANS FOR SEALING THE JOINTS BETWEEN THE
          MEMBERS COMPRISING ELECTROLYTIC CELLS
                   Filed June 24, 1937

INVENTOR.
Kenneth E. Stuart

Patented July 23, 1940

2,208,778

UNITED STATES PATENT OFFICE 2,208,778

MEANS FOR SEALING THE JOINTS BETWEEN THE MEMBERS COMPRISING ELECTROLYTIC CELLS

Kenneth E. Stuart, Niagara Falls, N. Y., assignor to Hooker Electrochemical Company, New York, N. Y., a corporation of New York Application June 24, 1937, Serial No. 150,146

4 Claims. (Cl. 220—46)

In Patent No. 1,866,065, issued to me on July 5, 1932, there is disclosed a type of electrolytic cell in which a non-conducting cover member is superposed upon an iron cathode member, which in turn is superposed upon a non-conducting bottom member containing the anode assembly. The cathode member of this cell is provided with a flanged frame providing upper and lower flat surfaces adapted to form joints with juxtapositioned flat surfaces of the cover and bottom members respectively. No gaskets are shown in these joints, the seal being provided by putty. Clamps are provided for increasing the pressure between the adjoining surfaces.

My present invention consists in forming grooves in the joint-forming surfaces of the non-conducting bottom and cover members, said grooves being adapted to receive gaskets, preferably of circular section, while allowing said gaskets to project slightly outside said grooves, so that when the three members are assembled in proper relation the pressure between them is carried by said gaskets. The gaskets are of course made of an elastic material, such as rubber, or braided fibrous material, such as asbestos, etc. The circular cross-section of the gasket results theoretically in line contact between the gasket and flat surface with which it engages. In practice, this contact becomes surface contact under the pressure between the parts, but the intensity of pressure, and consequently the efficacy of the sealing against leakage, is nevertheless greater than with gaskets or other cross-sectional shapes.

This type of rope-like gasket can be made up in coils of indefinite length. A piece of gasket may then be reeled off and cut to the right length, as required for use. This is obviously a more convenient form of gasket than one such as would be cut to shape out of a flat sheet, for example, especially as the cell is not circular, but rectangular, with rounded corners. Moreover, this gasket is relatively inexpensive, as there is no waste such as occurs when shaped gaskets are cut out from sheets.

Referring to the drawing.

Referring to the figures:

1 is the cover member of my cell, 2 the cathode member and 3 the bottom member, each superposed upon the next in the order given. This arrangement results in two horizontal joints, 4 and 5. These are sealed against leakage by my gasket, which is illustrated at 6.

Figure 1:
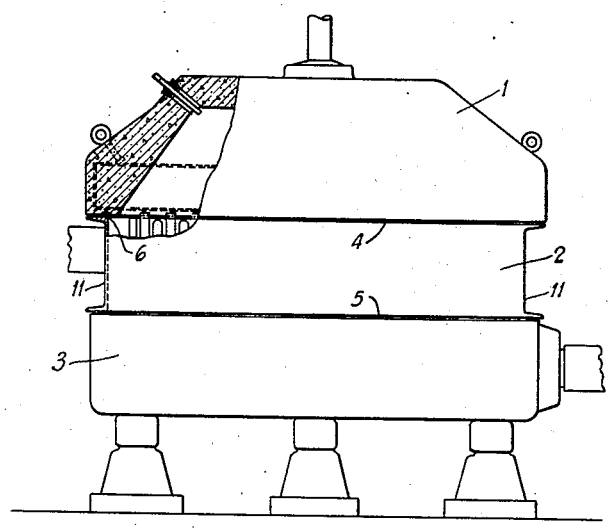
Fig. 1 is an elevational view of my electrolytic cell, partly broken away to show my gasket as applied for the purpose of sealing the upper joint.
Figure 2:
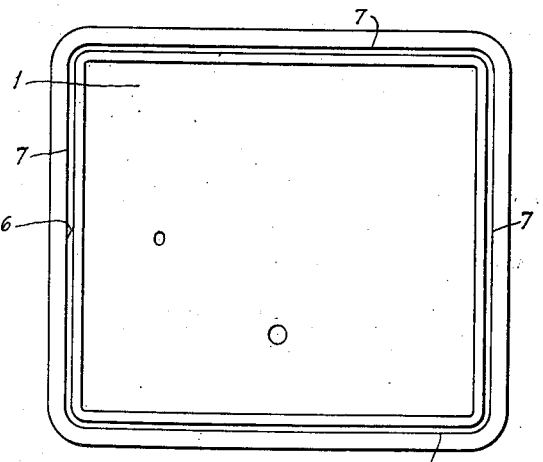
Fig. 2 is a plan view of the cover member in inverted position.
Figure 3:
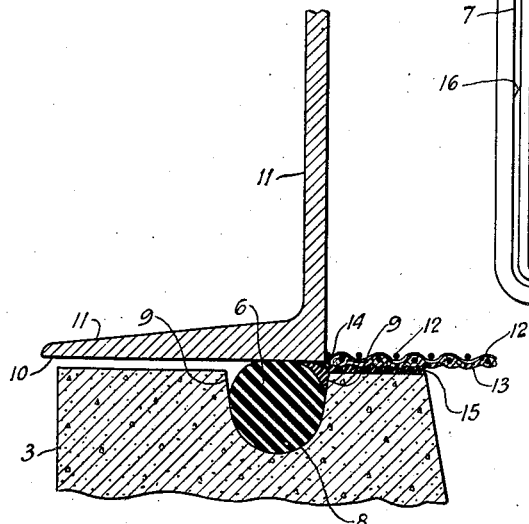
Fig. 3 is an enlarged cross-section through a portion of the cathode and lower non-conducting member forming the lower joint of my cell, showing my gasket in position for sealing the same.

The gasket 6, of circular cross-section, is housed in groove 7, which is preferably formed with a circular bottom 8, and flat sides 9, flaring away from each other at an acute angle of about 20 degrees. The diameter of the circular bottom should be slightly less than that of the gasket. Under these conditions, when the gasket is pressed into the groove it will wedge there and be gripped by the walls of the groove. It will consequently not fall out of the cover member when the latter is in its normal position. In Fig. 3 it can be plainly seen that the gasket is slightly deformed by the pressure of the side walls of the groove and by the pressure of the juxtapositioned flat surface 10.

The cathode of my electrolytic cell is formed of an outer frame of structural steel 11, of the section known as a "channel." Inside this frame, flush therewith and welded thereto is the wire screen 12, which constitutes the electrically active portion of the cathode. This wire screen is covered by a layer of asbestos 13, constituting a pervious diaphragm. The welded seam 14, between the channel frame and wire screen is designed to come opposite the joint-forming surface of the non-conducting cover or bottom member, as the case may be, and be overlapped thereby, and so that no bare metal is exposed within the cell. My gasket is so proportioned to the groove in which it is housed and to the pressure between the members of the cell that, as above stated, it will not allow the unyielding surfaces of these members to come into contact. The slight clearance space between them is therefore filled with an inert, waterproof plastic material, such as putty or bitumen, as illustrated at 15.

The gasket, after having been pressed into the groove around three sides of the joint, may be cut off at the right length to exactly fill up the groove of the fourth side. If of rubber, the two sides may then be cemented together as illustrated at 16, to form an endless gasket.

By making the cover member of my cell fairly massive, I find that the clamps illustrated in my said patent may be dispensed with. This is unobjectionable as these parts are in any event necessarily lifted by mechanical means. The heavy construction also serves the purpose of affording better insulation against loss of heat from the cell.

A piece of ordinary garden hose makes a very good gasket for my purpose but I prefer to use a gasket of solid, molded rubber or one of the synthetic rubber substitutes, such as "Duprene," and in particular one of those substitutes made from a chlorinated hydrocarbon, such as "Pliolite," or other chemical compositions containing sulphur as well as chlorine, such as "Thiocol." In the appended claims the expression "rope-type gasket" is to be understood as signifying any gasket of the type that can be made in indefinite lengths and coiled or wound on a reel and cut to length as required, whether of fibrous, twisted or braided material or of extruded elastic material such as natural or synthetic rubber, etc.

I claim as my invention:

1. In a pressure container characterized by members having flat, juxtapositioned surfaces forming between them a joint, means for sealing said joint comprising a groove in the joint-forming surface of one of said members, said groove being formed with a concave curvilinear bottom and flat outwardly divergent sides substantially tangent thereto and making an acute angle with each other, and a rope-type elastic gasket in said groove, said gasket being of normally convex curvilinear cross section and having a radius slightly greater than said bottom and a cross sectional area slightly greater than said groove and adapted when pressed into said groove to bear against the flat sides before contacting the bottom thereof and likewise to bear against the flat joint-forming surface of the other of said members.

2. In a pressure container characterized by superposed members having flat, horizontal, juxta-positioned surfaces forming between them a joint, means for sealing said joint comprising a groove in the joint-forming surface in the uppermost of said members, said groove being formed with a concave curvilinear bottom and flat outwardly divergent sides substantially tangent thereto and making an acute angle with each other, and a rope-type elastic gasket in said groove, said gasket being of normally convex curvilinear cross section and having a radius slightly greater than said bottom and a cross sectional area slightly greater than said groove and adapted when pressed into said groove to bear against the flat sides before contacting the bottom thereof and likewise to bear against the flat joint-forming surface of the other of said members.

3. In a pressure container characterized by members having flat, juxta-positioned surfaces forming between them a joint, means for sealing said joint comprising a groove in the joint-forming surface of one of said members, said groove being formed with a concave curvilinear bottom and flat outwardly divergent sides substantially tangent thereto and making an acute angle with each other, and a rope-type elastic gasket in said groove, said gasket being of normally circular cross section and having a radius slightly greater than said bottom and a cross sectional area slightly greater than said groove and adapted when pressed into said groove to bear against the flat sides before contacting the bottom thereof and likewise to bear against the flat joint-forming surface of the other of said members.

4. In a pressure container characterized by members having flat, juxta-positioned surfaces forming between them a joint, means for sealing said joint comprising a groove in the joint-forming surface of one of said members, said groove being formed with a concave curvilinear bottom and flat outwardly divergent sides substantially tangent thereto and making an angle of substantially 20° with each other, and a rope-type elastic gasket in said groove, said gasket being of normally convex curvilinear cross section and having a radius slightly greater than said bottom and a cross sectional area slightly greater than said groove and adapted when pressed into said groove to bear against the flat sides before contacting the bottom thereof and likewise to bear against the flat joint-forming surface of the other of said members.

KENNETH E. STUART.